No. 832,824. PATENTED OCT. 9, 1906.
H. H. WAIT.
MAGNETIC ORE SEPARATOR.
APPLICATION FILED MAR. 20, 1905.

5 SHEETS—SHEET 1.

Witnesses:

Inventor:
Henry H. Wait,
By Barton & Tanner
Att'ys.

No. 832,824. PATENTED OCT. 9, 1906.
H. H. WAIT.
MAGNETIC ORE SEPARATOR.
APPLICATION FILED MAR. 20, 1905.
5 SHEETS—SHEET 2.
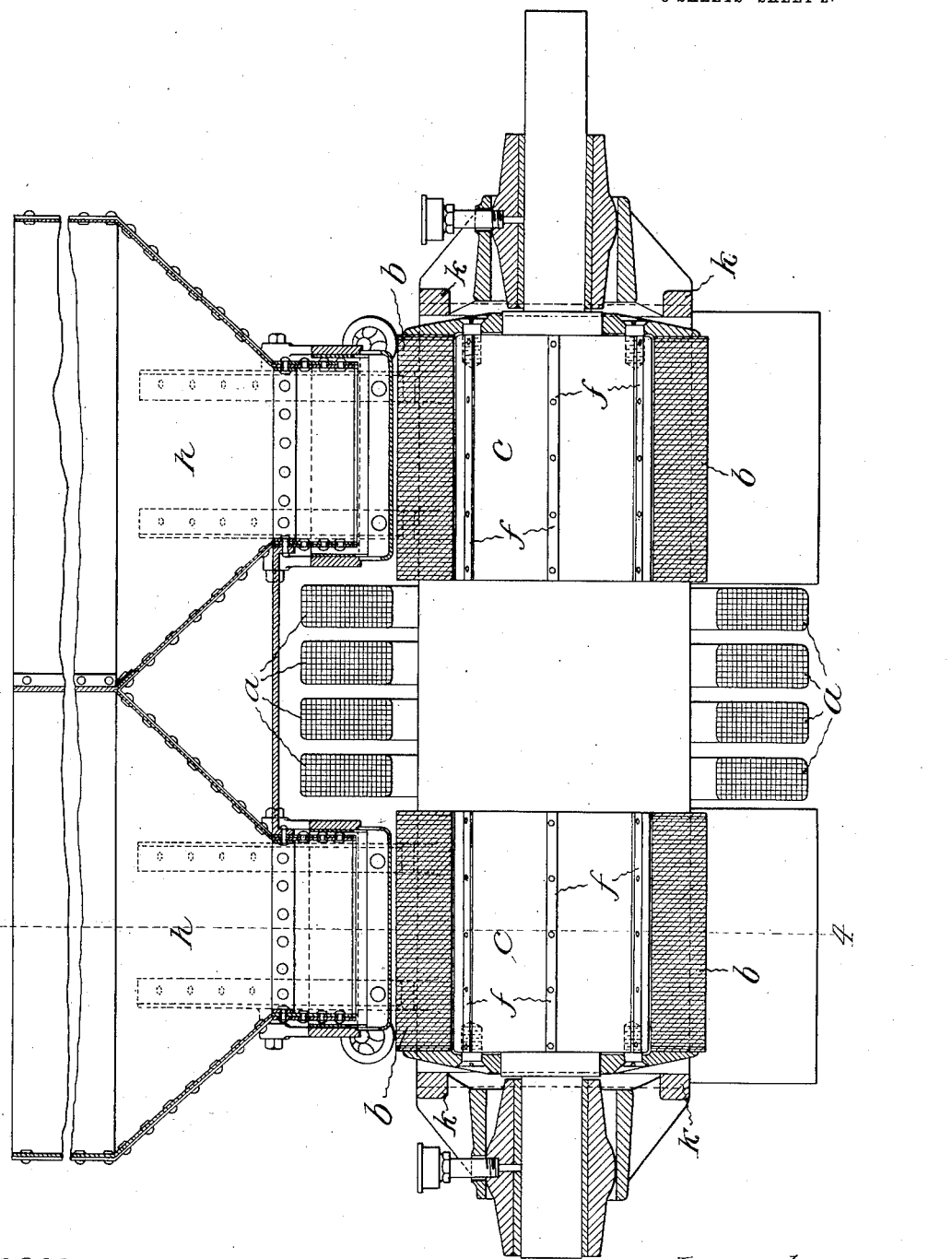

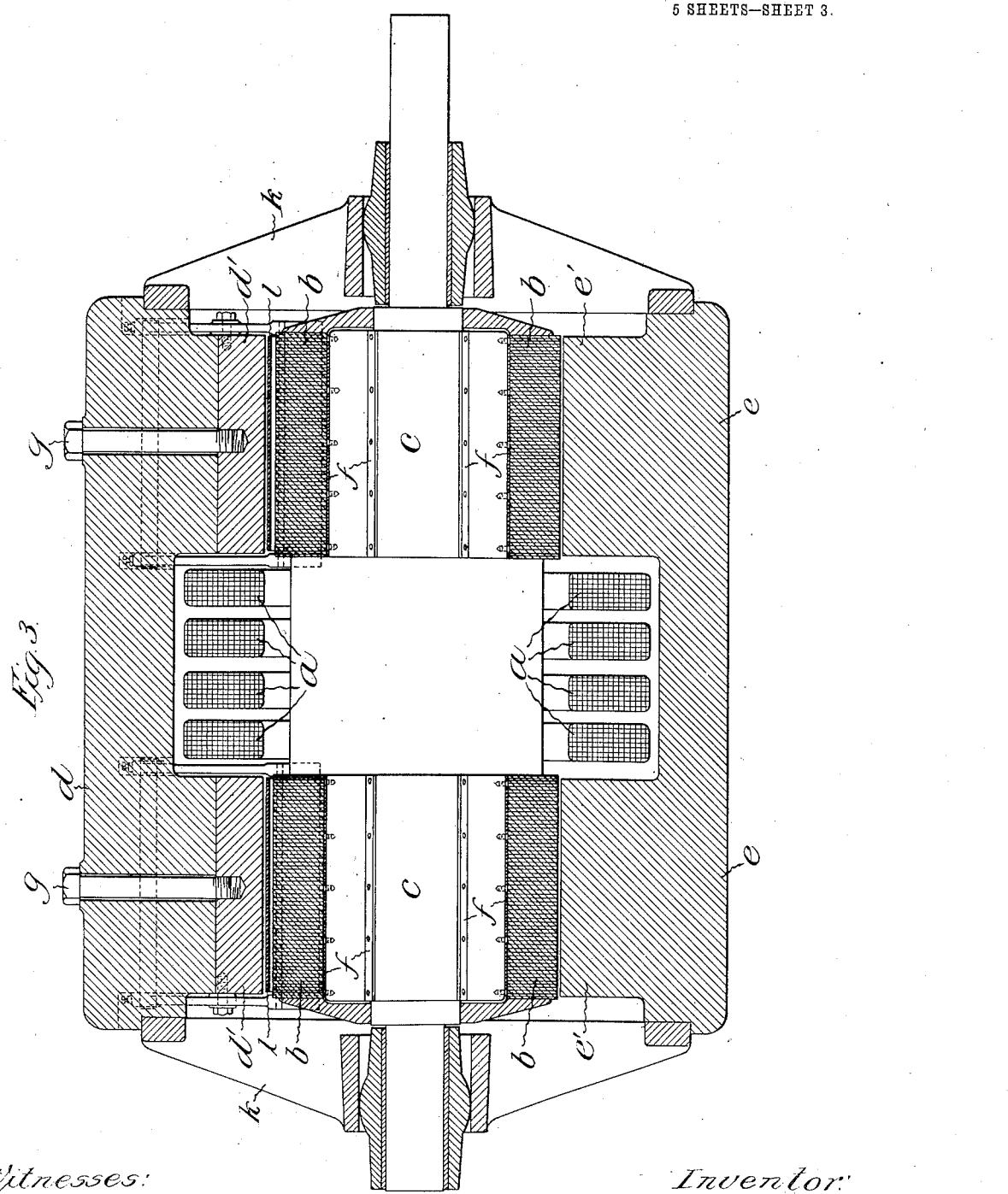

No. 832,824. PATENTED OCT. 9, 1906.
H. H. WAIT.
MAGNETIC ORE SEPARATOR.
APPLICATION FILED MAR. 20, 1905.

5 SHEETS—SHEET 4.

Witnesses:
Geo. C. Davison
Irving MacDonald.

Inventor:
Henry H. Wait,
By Barton & Tanner
Att'ys.

No. 832,824. PATENTED OCT. 9, 1906.
H. H. WAIT.
MAGNETIC ORE SEPARATOR.
APPLICATION FILED MAR. 20, 1905.
5 SHEETS—SHEET 5.
Fig. 7
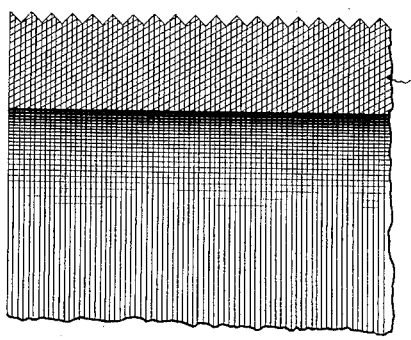
Fig. 8.
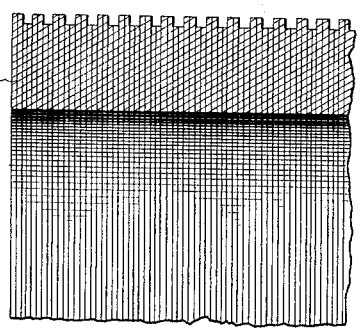
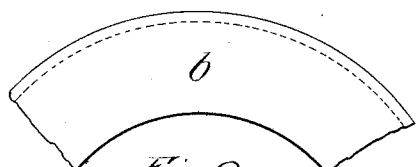
Fig. 9.
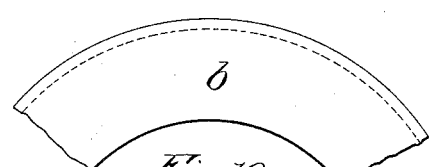
Fig. 10.
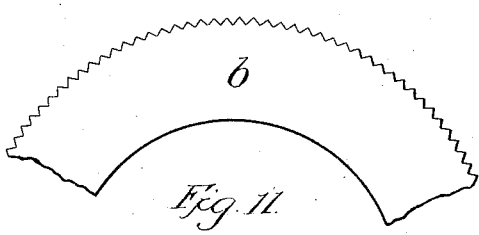
Fig. 11.
Fig. 12.
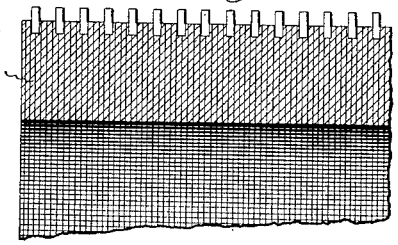
Fig. 13.
Witnesses:
Geo. C. Davison
Irving MacDonald
Inventor:
Henry H. Wait,
By Barton & Tanner
Attys

UNITED STATES PATENT OFFICE.

HENRY H. WAIT, OF CHICAGO, ILLINOIS, ASSIGNOR TO INTERNATIONAL SEPARATOR COMPANY, OF CHICAGO, ILLINOIS, A CORPORATION OF NEW JERSEY.

MAGNETIC ORE-SEPARATOR.

No. 832,824.　　　Specification of Letters Patent.　　　Patented Oct. 9, 1906.

Application filed March 20, 1905. Serial No. 251,068.

*To all whom it may concern:*

Be it known that I, HENRY H. WAIT, a citizen of the United States, residing at Chicago, in the county of Cook and State of Illinois, have invented a certain new and useful Improvement in Magnetic Ore-Separators, of which the following is a full, clear, concise, and exact description.

My invention relates to a magnetic ore-separator; and its object is, in general, to provide an improved, simple, and effective machine of the class mentioned in which the magnetic and electric circuits will be closely interlinked and in which the machine may be operated to produce effective separation of materials of low permeability with a comparatively little expenditure of energy.

I will describe my invention in detail by reference to the accompanying drawings, which illustrate the preferred embodiment thereof, and the parts, improvements, or combinations which I regard as novel will be pointed out in the appended claims.

Figure 1:
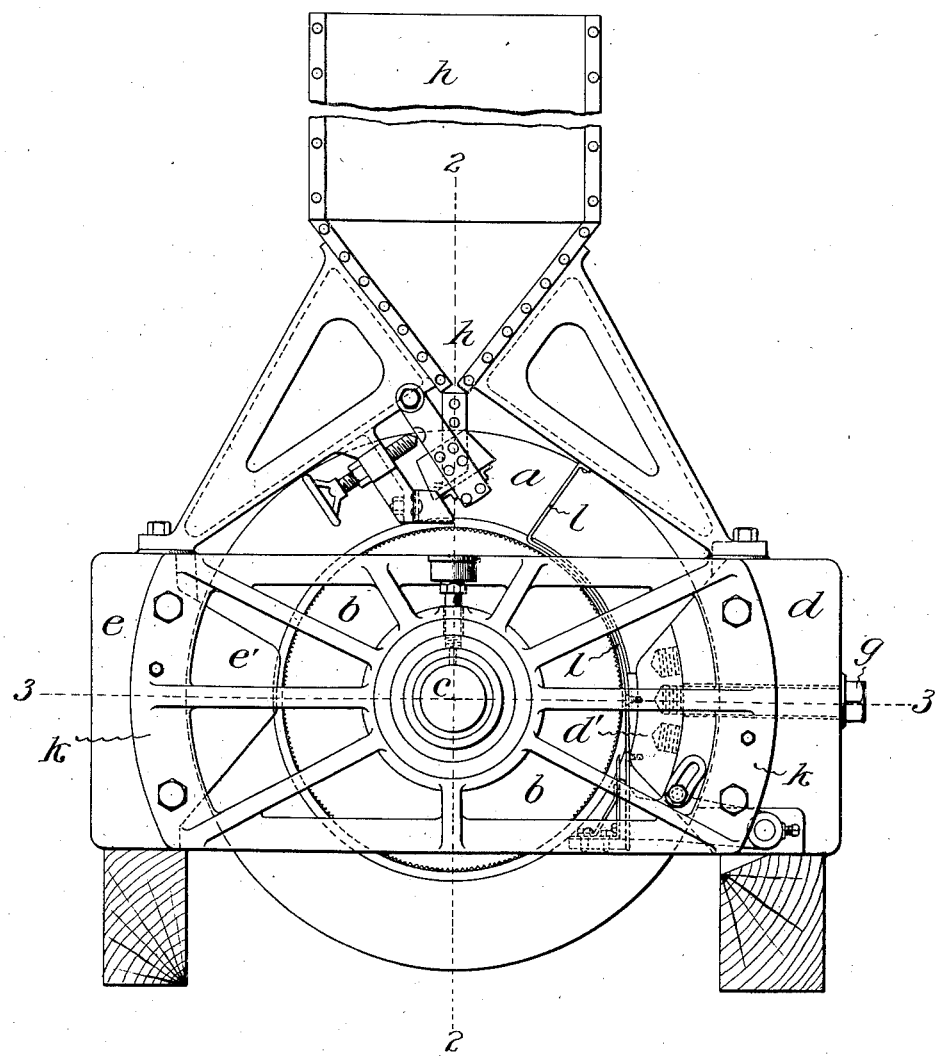
Figure 5:
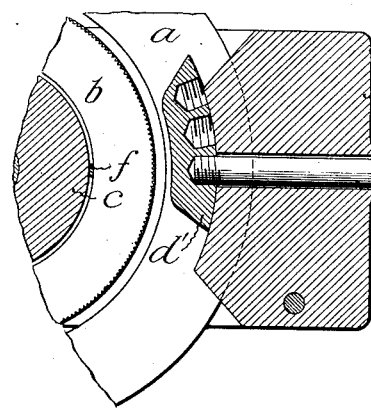
Figure 6:
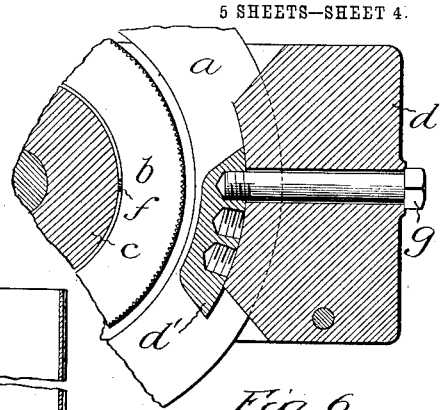
Figure 4:
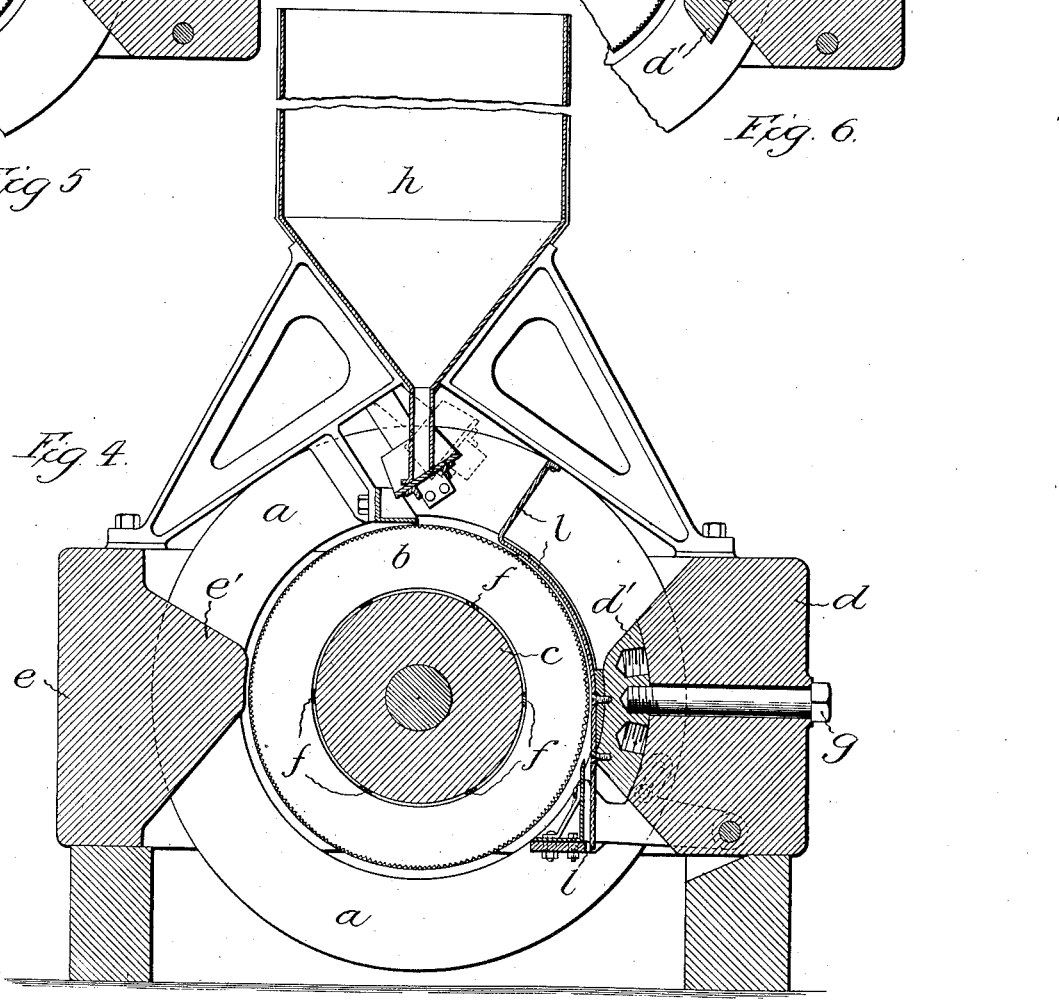

Figure 1 is a view of the machine in elevation looking at the end thereof. Fig. 2 is a vertical sectional elevation on line 2 2 of Fig. 1. Fig. 3 is a sectional plan view on line 3 3 of Fig. 1. Fig. 4 is a transverse vertical sectional view on line 4 4 of Fig. 2. Figs. 5 and 6 are detail fragmentary views illustrating how one of the magnetic bodies adjacent to the rotating drum can be adjusted concentric to said drum to vary the angle at which separation takes place. Fig. 7 is a detail sectional view of a portion of one of the rotating annular pole-pieces of the machine, showing one form of the permeable projections upon its periphery. Fig. 8 is a similar view showing another form of permeable projection. Figs. 9 and 10 are side views of segments of the annular drums indicated in Figs. 7 and 8, respectively. Fig. 11 is a detail segmental view showing another form of teeth for said revolving annular pole-piece or drum. Figs. 12 and 13 are detail views showing still another modified form of projections upon the rotating drum or annular pole-piece, the projections in this case being indicated as magnetic pins set in the periphery of the drum.

The same letters of reference indicate the same parts throughout the several figures.

As shown in the drawings, the working air-gap through which the material to be separated is passed is formed by the space between a revolving cylinder and an adjacent magnetic body or armature, the revolving cylinder being provided with teeth or means for causing dispersions of the magnetic flux at its periphery, so that the more permeable material in the mixture being treated will be attracted to the cylinder.

To offset or approximately balance the magnetic pull upon the cylinder, which is very great, a second magnetic body or armature is provided approximately diametrically opposite the first-mentioned armature, and the magnetizing-helix is located to set up a magnetic flux from said rotating cylinder in parallel through both of said magnetic bodies or armatures.

More particularly, the machine illustrated is provided with a magnet-core which is surrounded by a magnetizing-helix $a$, preferably around the middle portion thereof, so as to produce magnetic poles at each end. Each end of the core may therefore be utilized as a working magnet and is provided with an annular magnetic pole-piece or separating-cylinder $b$. These separating-cylinders $b\ b$ are arranged to revolve axially, and this can be accomplished very simply by mounting them directly upon the core $c$ and providing journals for said core, so that it may turn upon its axis. The core, helix, and pole-pieces may thus be compared to an ordinary spool, the heads and body of which are magnetic, while the central portion is surrounded by the helix. An armature $d$ is provided along one side of the spool, having polar projections $d'\ d'$, facing the cylindrical surfaces of the annular pole-pieces $b\ b$, respectively, and so providing two working air-gaps through which the material to be separated may pass. For this purpose two hoppers $h\ h$ are arranged above the machine to receive the ore, these hoppers being provided with feeding mechanism, as shown, by which the stream of ore can be directed upon the tops of the cylinders $b\ b$ and carried around in the rotation thereof past the polar projections $d'\ d'$ of the stationary armature $d$. A balancing-armature $e$ is also provided along the other side of the rotating magnet and is equipped with polar projections $e'\ e'$, which face said rotating annular pole-pieces or cylinders $b\ b$ at points substantially diametrically opposite the polar projections $d'$ $d'$, the object being to offset or balance so near as is practicable the magnetic attraction upon the rotating magnet in order that the latter may turn with the greatest possible freedom in its bearings.

In order that the more permeable material in the mixture being treated may be attracted to the surface of the rotating cylinder rather than to the stationary magnetic body, the cylinder is provided with permeable projections or teeth upon its periphery, so that convergences of the magnetic flux will be established toward the cylinder, it being known that the attraction of magnetic particles is, generally speaking, along converging lines of force. These convergences may be produced in a great variety of ways. The surface of the cylinder may be grooved circumferentially, as shown in Figs. 7, 8, 9, and 10. It may be provided with serrations or teeth, such as shown in Fig. 11, or it may be provided with a number of iron pins set in its periphery, as shown in Figs. 11 and 12. In most cases I prefer to employ the serrated teeth. The annular pole-pieces should be laminated transversely in order that they may turn freely in the intense magnetic field, and this laminated construction lends itself readily to the production of a toothed surface. The laminated construction is also preferable to the production of the flux convergences referred to, since the lines of force naturally tend to converge upon the edges of the individual laminations. In many cases, however, it will be desirable to use the pin construction indicated in Figs. 11 and 12, these pins forming teeth of considerable length upon the surface of the separating-cylinder. In such case I find it desirable to adjust the feeding mechanism to feed the ore or other material being treated in a thin stream upon the cylinder—that is to say, in a stream thinner than the length of the teeth—so that the teeth will effectively reach all portions of the stream of material in such a manner as to draw out the most finely-divided magnetic particles. I also prefer in such cases to feed the ore through the working air-gap at a velocity faster than the velocity of the surface of the cylinder, so that the ore in falling will sift through the teeth, or the effect may also be produced by causing the pins to pass through the mixture at a velocity greater than the velocity of the stream of material to freely work through the stream. Such a construction and mode of operation is especially desirable for taking out highly magnetic particles, such as iron-powder, from a mixture of other pulverized material which is in too finely divided a form to be passed through the separator in a thin enough sheet to permit all the iron particles to come in contact with the ordinary roughened magnetic surface.

As previously mentioned, the working surface or revolving pole-pieces $b$ $b$ of the magnet are made of laminated iron or steel to avoid eddy-currents due to the difference in magnetic density near the stationary armatures as compared with the surrounding parts of the cylindrical pole-face. If the laminations are comparatively thin radially and come in direct contact with the central solid core of the magnet, it will be seen that there would still be a somewhat higher density in the portions of the solid core nearest the stationary armatures. If any considerable difference in density existed, eddy-currents would therefore be caused in the revolving core $c$. In order to reduce such eddy-currents to a negligible amount, the annular laminated pole-pieces $b$ $b$ are separated by small air-gaps from the body of the core. These air-gaps have the effect of distributing the magnetism so that it is practically equal all around the circumference. This saturation can be produced by any suitable construction. I have shown longitudinal strips $f f$ of non-magnetic material upon the surface of the core forming distance-pieces, the laminated rings which form the annular pole-piece being thus supported by said distance-pieces instead of directly by the core. It is not essential that such distance-pieces be made of non-magnetic material, since saturated projections or distance-pieces of projections of iron would become so magnetically saturated that they could not carry all the flux and would cause a distribution thereof circumferentially around the core, as described. This feature of my invention will be of utility in magnetic apparatus generally, and I do not wish to limit its application in this respect to magnetic separators only.

Referring again to the balancing-armature $e$, I prefer to form the polar projections $e'$ $e'$, as shown most clearly in Figs. 3 and 4, with faces of small area as compared to the polar faces of the working armatures and set closely to the surface of the rotating magnet. The magnetic flux through the balancing-armature being in parallel with the working flux through the armature $d$, it is apparent that this balancing-flux is, in effect, leakage and should be reduced to the smallest amount possible in order to produce the balancing effect. The magnetic pull is proportional to the square of the density of the magnetic flux, and by making the area of the balancing polar projections $e'$ $e'$ comparatively small and bringing them as close as practicable to the surface of the rotating magnet I am enabled to secure a magnetic pull upon the rotating magnet sufficient to offset or approximately balance the pull toward the working armature with the expenditure of a minimum amount of energy in producing the balancing or leakage flux.

Another feature of the machine to which I desire to call attention is the construction by which the polar projections $d'$ $d'$ of the working armature can be shifted or adjusted upon said armature in an arc concentric with the rotating cylinders. These polar projections $d'$ $d'$ are made separate from the main body of the armature $d$, the joint being in an arc concentric with the cylinder. In the form shown these projections are fastened in place by bolts $g$ $g$, passing through the armature from the back and into the polar projection. Several holes are provided in the projection threaded to receive the threaded end of the bolt, and the projection can be shifted into such a position as to receive the bolt in any one of these holes, as illustrated in Figs. 4, 5, and 6. The object of this adjustment is to provide means for changing the angle at which separation takes place without unduly disturbing the other magnetic conditions.

It should be stated that in the machine shown in the drawings the spiders $k$ $k$ at the ends of the machine which support the journals for the ends of the rotating magnet should be of non-magnetic metal, so as to confine the flux to its path through the annular laminated pole-pieces and to prevent leakage.

The operation of the machine will be readily understood. The ore received in the hoppers $h$ $h$ is fed upon the upper surface of the annular pole-pieces $b$ $b$ and is carried around in the rotation thereof through the working air-gaps between said pole-pieces and the polar projections $d'$ $d'$ of the armature $d$. The face of each polar projection is preferably covered by a thin shield or plate $l$, of non-magnetic metal, (although thin sheet-iron may be used,) and the permeable particles in the mixture passing through the working air-gap are directed toward the surface of the rotating cylinders, being drawn along converging lines of force toward the edges of the teeth. Adjacent to the under sides of the rotating cylinders the usual divider-plates are provided in proper adjustment so that the magnetic particles adhering to the cylinder will be carried past the divider-plate, while the non-magnetic particles will fall down on the other side thereof, the separation being thus completed. The magnetic flux from the cylinders is so localized and directed through the return magnetic circuits $d$ and $e$ that there is very little magnetism noticeable upon the surface of the cylinders along the line midway between the two armatures $d$ and $e$, so that the attracted material will be released along the line where the density has been very greatly reduced. If desired, however, any attracted particles adhering to the cylinder may be removed at this point by brushes, such as are well-known in the art.

Having thus described my invention, I claim—

1. In a magnetic separator, the combination with a magnet-core mounted to rotate axially, of a magnetizing-helix surrounding said core, a laminated annular pole-piece mounted upon said core to rotate therewith, said pole-piece having means for causing dispersions of the magnetic flux at its periphery, fixed armatures facing said rotating pole-piece on approximately diametrically opposite sides thereof and completing parallel branches of the magnetic circuit of said core, and means for passing material to be separated between said revolving annular pole-piece and one of said fixed armatures.

2. In a magnetic separator, the combination with a magnet-core, of a magnetizing-helix surrounding said core, a laminated annular pole-piece for said core, mounted to rotate axially and having means for securing dispersions of the magnetic flux at its periphery, a stationary armature adjacent to the periphery of said annular pole-piece and completing the magnetic circuit of said core, and means for passing material to be separated between said armature and pole-piece into contact with said pole-piece.

3. In a magnetic separator, the combination with a core, of a magnetizing-helix surrounding the central portion of said core, laminated annular pole-pieces concentric with said core at either end of said helix, said annular pole-pieces being mounted to rotate axially and having means for causing dispersions of the magnetic flux at their peripheries, a stationary armature on one side of said core facing said annular pole-pieces, means for passing material to be separated between said armature and each of said rotating pole-pieces, and a stationary armature facing said rotating pole-pieces substantially diametrically opposite said first-mentioned armature.

4. In a magnetic separator, the combination with a magnet-core and a magnetizing-helix therefor, of an axially-rotatable laminated drum forming a pole-piece for said core, a stationary armature at one side of said drum, means for feeding material to be separated between said drum and said armature, and an armature facing said drum substantially diametrically opposite the first-mentioned armature, said last-mentioned armature having a face of smaller area set in close proximity to the drum, whereby the magnetic pull upon the drum is approximately balanced with a minimum leakage of the magnetic flux, substantially as set forth.

5. In a magnetic separator, the combination with a revolving magnet, a magnetizing-helix therefor, an armature, means for passing material to be separated through the working air-gap between said magnet and its armature, a balancing-armature opposite said first-mentioned armature, a magnetizing-helix establishing a magnetic flux through said magnet and in parallel through said armature, the balancing-armature being proportioned and placed so as to provide for a balancing-flux of lesser area and higher density than is provided in the working air-gap.

6. In a magnetic apparatus, the combination with an axially-rotatable magnetic core and a magnetizing helix or helices energizing the same, an annular laminated pole-piece mounted upon the core to rotate therewith, an auxiliary magnet or magnets completing the circuit for said magnet, adjacent to said pole-piece, and means separating said pole-piece from said core, whereby the distribution of the magnetic flux between the core and pole-piece is substantially equalized around the circumference of the core.

7. In a magnetic separator, the combination with a rotatable magnetic separating-cylinder having means for causing flux dispersions at its periphery, of a stationary armature adjacent said cylinder, means for passing material to be separated between said armature and cylinder, a polar projection upon said armature facing said cylinder and concentric thereto, and means for giving said projection different positions thereon to vary the angle at which separation occurs.

8. In a magnetic separator, the combination with a revolving magnet, said magnet being provided with magnetic teeth, of an armature adjacent said revolving magnet, means for passing material to be separated between said magnet and said armature, and a balancing-armature facing said revolving magnet to oppose said first-mentioned armature and in parallel relation thereto with respect to the magnetic flux.

9. In a magnetic separator, the combination with a revolving magnet provided with an annular laminated pole-piece, an armature adjacent said revolving pole-piece, means for passing material to be separated between said pole-piece and armature, and an armature facing said pole-piece opposite said first-mentioned armature, said armatures being of the same polarity and of opposite polarity to said pole-piece, and in parallel relation to said electromagnet and pole-piece with respect to the magnetic flux.

10. In a magnetic separator, the combination with a rotatable magnetic separating-cylinder having means for causing flux dispersions at its periphery, of a stationary armature adjacent said cylinder, means for passing material to be separated between said armature and cylinder, a polar projection upon said armature facing said cylinder and concentric thereto and provided with a series of openings, and a bolt adapted to pass through said armature into any one of the series of openings in said projection to give said projection different concentric positions with respect to said cylinder.

11. In a magnetic separator, the combination with an axially-rotatable magnetic separating-cylinder having means for causing flux dispersions at its periphery, of an armature on one side of said cylinder, means for passing material to be separated between said armature and cylinder, a polar projection for said armature facing said cylinder and adjustable upon said armature in a path concentric with said cylinder, and a balancing-armature on the opposite side of said cylinder, said armature being cut away to have a polar face of small area.

12. In a magnetic separator, the combination with a rotatable magnet-core, of a magnetizing-helix surrounding a portion of said core, a laminated annular pole-piece mounted upon the end of said core to rotate therewith, said pole-piece having means for causing flux dispersions at its periphery, an armature adjacent said pole-piece, means for passing material to be separated between said armature and pole-piece, and a balancing-armature facing said armature to oppose said first-mentioned armature and in parallel relation thereto with respect to the magnetic flux.

13. In a magnetic apparatus, the combination with an axially-rotatable magnetic core, of a magnetizing-helix surrounding the same, an annular laminated pole-piece mounted upon the core to rotate therewith, longitudinal non-magnetic strips upon the surface of the core supporting said laminated pole-piece and forming distance-pieces to separate said pole-piece from the core, and an auxiliary magnet completing the circuit for said core, whereby the distribution of the magnetic flux between the core and pole-piece is substantially equalized around the circumference of the core.

In witness whereof I hereunto subscribe my name this 13th day of March, A. D. 1905.

HENRY H. WAIT.

Witnesses:
IRVING MACDONALD,
DE WITT C. TANNER.